United States Patent

Headley et al.

[11] 4,347,414
[45] Aug. 31, 1982

[54] ARC SHORTING DEVICE

[75] Inventors: Peter Headley, Tynemouth; Thomas Kelsey, Wylam; John Murdy, Washington, all of England

[73] Assignee: Northern Engineering Industries, Limited, Newcastle-on-Tyne, England

[21] Appl. No.: 146,297

[22] Filed: May 5, 1980

[51] Int. Cl.³ .............................................. H01H 33/04
[52] U.S. Cl. ............................ 200/144 R; 200/148 R
[58] Field of Search ............ 200/144 R, 148 R, 148 D

[56] References Cited

U.S. PATENT DOCUMENTS 3,163,737 12/1964 Gonek et al. .................... 200/148 D Primary Examiner—Robert S. Macon

[57] ABSTRACT

In or for a fluid-filled metal-clad switchgear an automatically-operating device for short-circuiting an internal arc in the earthed metal enclosure comprises a piston movable in a cylinder mounted on the enclosure wall, with a rod projecting towards the interior space filled with insulating medium. A pipe or other means connects the space to the cylinder at the remote side of the piston, so that on occurrence of an internal arc in the enclosure the rapid pressure rise creates a pressure differential across the piston to drive it and the rod inwardly and cause the rod to engage the high-voltage conductor and short-circuit the arc to the earthed enclosure. The piston is held normally by a spring or by breakable pegs.

9 Claims, 5 Drawing Figures

ARC SHORTING DEVICE

BACKGROUND OF THE INVENTION

This invention relates to an arc-shorting device which is particularly, although not exclusively, applicable to fluid-filled metal-clad switchgear employing $SF_6$ gas or other gas or liquid as the electrical insulating medium.

Should an internal arc occur in an enclosure of a metal-clad switchgear installation, a very rapid increase in the pressure of the insulating fluid would occur and the burning arc would cause damage to the installation. The pressure rise would depend on factors such as the magnitude of the fault-current and the arc-voltage, the duration of the arc and the volume of the enclosure. Such an occurrence could cause an explosive failure or a burn-through of the enclosure, which could release a quantity of high-pressure, ionised and perhaps toxic gas.

This eventuality must be guarded against by limiting the pressure rise, removing the arc as quickly as possible or else taking steps to minimise the effects of the arc. This may be done by means of a protection system which detects the fault and opens an associated circuit-breaker to interrupt the current and remove the arc.

It is also known to use a remotely-located earth-switch, which effectively short-circuits the arc.

Even with the fastest protection systems, it may take up to 80 milliseconds to clear the fault arc. Not all systems could respond as quickly, and if a fault occurred in the protective system or in the circuit-breaker itself the operation of a back-up protection system could result in an arc duration of 500 milliseconds or more.

The operation of high-speed earth-switches via associated protective circuitry can also lead to excessive arc durations.

A large gas volume in the enclosure is desirable to limit the pressure rise but is not always practicable from a service and economic point of view. A further solution involves connecting small enclosures to adjacent larger enclosures by employing collapsible insulating barriers, which are arranged to fail when a certain pressure is reached. This system entails careful co-ordination of the mechanical strengths of components and spreads the effects of arcing.

Other proposed methods of overcoming this problem have included the provision of bursting discs or diaphragms. These must be large enough to provide the necessary pressure relief, but since they are arranged to vent the enclosure externally, they defeat a major objective, which is to minimise any external manifestation of the arc.

BRIEF SUMMARY OF THE INVENTION

An object of the invention is to provide means whereby an internal arc is short-circuited.

According to the present invention an arc-shorting device in high voltage metal-clad switchgear comprising a conductor within an enclosure containing fluid insulating medium, which device comprises a contact movable to a position to inter-connect said conductor electrically to said enclosure and piston-and-cylinder mechanism the cylinder of which communicates with the interior of said enclosure, said mechanism being operable in response to a rise in pressure in said fluid medium upon occurrence of an arc in said enclosure to move said contact to said position.

Preferably, the device comprises means for mounting said device on an enclosure of said switchgear containing fluid insulating medium, said device further comprising a cylinder, a piston movable in said cylinder and having first and second sides, a contact advanceable by said piston from a first retracted position, to a second advanced position in which the contact engages a conductor within said enclosure to connect the conductor electrically to said enclosure, first means establishing communication between the interior of said enclosure and the interior of said cylinder at said first side of said piston, second means defining a space, third means establishing communication between said space and the interior of said cylinder at said second side of said piston, and restraint means to hold said piston in said first position, whereby rise in pressure in said fluid medium upon occurrence of an arc in said enclosure causes a pressure difference across said piston to overcome said restraint means whereupon said piston advances said contact to said second position.

Preferably the device has a piston-driven short-circuiting contact which on actuation of the device electrically connects the high-voltage component(s) to the earth-potential of the enclosure, and means is provided for subjecting the driving piston of the said contact to a differential fluid pressure created by a said pressure rise in the fluid insulating medium within the enclosure to actuate the device.

The speed of operation of the device is thus dependent upon the pressure differential across the driving piston, which in turn depends on the rate of pressure rise in the medium within the enclosure; thus the higher the rate of pressure rise, the faster the device will operate.

In a preferred embodiment the piston of the short-circuiting contact is housed in a cylinder e.g. on or within the enclosure vessel walls, and the short-circuiting contact comprises the piston rod of the said piston.

In one embodiment the short-circuiting contact is spring-biased against inadvertent operation; in another embodiment contact restraint is provided by one of more breakable detents, e.g. mechanical pegs.

BRIEF DESCRIPTION OF THE DRAWINGS

Examples of arc shorting devices will now be described by way of example to illustrate the invention with reference to the accompanying drawings, in which:

FIG. 1 shows a metal-clad high-voltage switchgear in which a high-voltage conductor 10 is housed in an enclosure 11 containing SF₆ insulating gas in a space 12 defined between the vessel walls. An arc shorting device 13 is fixed in a gas-tight manner at an opening 14 in a wall of the vessel 11, and comprises a flanged housing 15 secured in gas-tight manner to a plate 16, which is fixed to flanges 14a around the opening 14.

Figure 1:
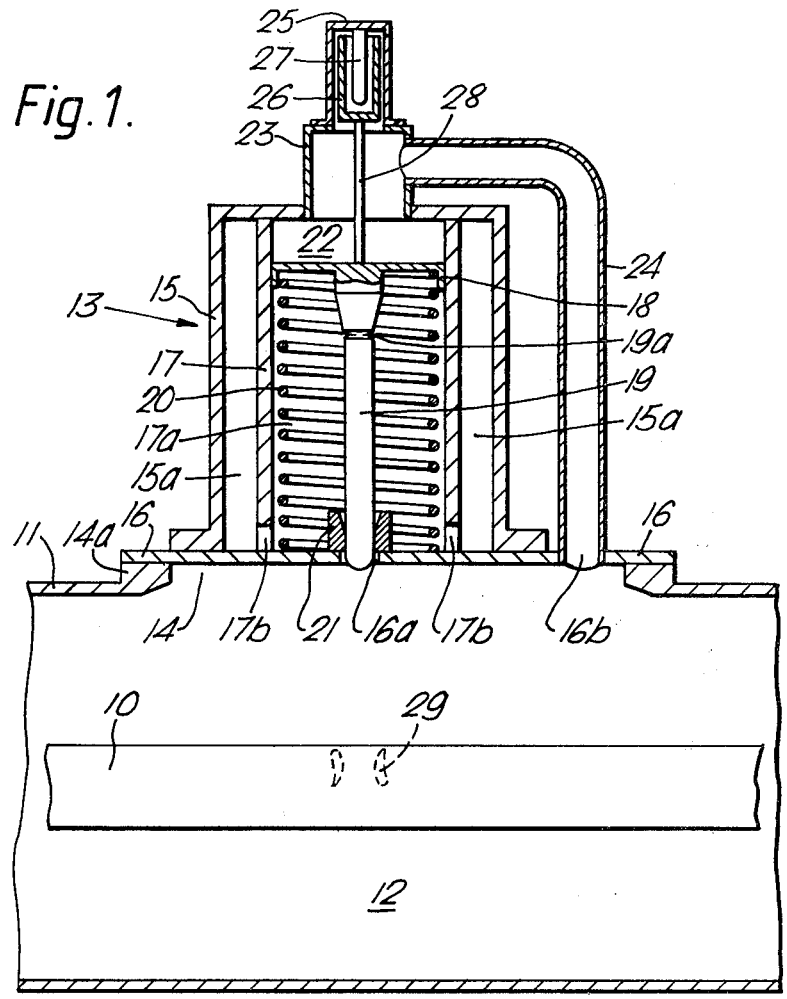
FIG. 1 is a diagrammatic vertical section through a metal-clad high-voltage enclosure incorporating one form of device.

The housing 15 is circular and contains a cylinder 17 in which there is a piston 18 and a contact rod 19. The underside of the piston 18 rests against a coiled compression spring 20, which biases the piston toward the top of the cylinder 17. The contact rod 19 is located within a hole 16a with clearance in the plate 16 and is surrounded by spring-contact fingers 21 mounted on, and electrically connected to, the plate 16. The upper portion of the contact rod 19 has an annular detent groove 19a, and the fingers 21 have tapered ends so that obtuse corner portions locate positively within the detent groove 19b on operation of the switch as described below, to hold the contact closed after operation.

The upper region of the cylinder 17 defines a space 22 above the piston 18 connected to a chamber 23 on the top of the housing 15. A pipe 24 is connected at one end to the chamber 23 and at the other end to an inlet port 16b in the plate 16, so that the space 22 is connected by the pipe 24 and the chamber 23 to the space 12.

On top of the chamber 23 a transparent perspex or glass tube 25 is fixed on top of the chamber 23 and contains a green indicator sleeve 26, which is visible when the contact is open. The sleeve 26 is connected to the piston 18 by a rod 28. A fixed red indicator rod 27 becomes visible when the piston 18 is lowered but is screened by the sleeve 26 when the piston 18 is raised.

Contacts 29 may be provided on the conductor bar 10 for co-operation with the contact rod 19 but may not be necessary to ensure adequate electrical connection.

Figure 2:
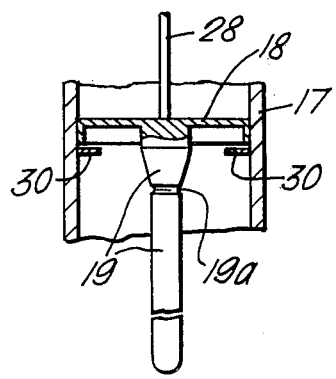
FIG. 2 shows detail of an alternative form of piston restraint for use in the device shown in FIG. 1.

Instead of the spring 20 two small breakable plastic pegs 30 protruding from the cylinder wall 17 may be used to hold the piston 18 and contact rod 19 as shown in FIG. 2.

FIG. 1 shows the switchgear installation in normal operating condition with a high voltage existing on the conductor 10. The enclosure 11 is earthed.

Should an arc between the conductor 10 and the enclosure 11 occur anywhere within the enclosure 11, the pressure of the SF₆ gas rises very rapidly. This pressure rise is transmitted through the pipe 24 to the chamber 23 and to the rear face of the piston 18. The annular clearances between the rod 19 and the plate 16 at the hole 16a and between the piston 18 and the cylinder 17 are quite small and are carefully chosen to ensure that the pressure rise is not immediately transmitted to any significant extent to the space 17a below the piston 18. When the gas pressure level in the vessel 11 reaches a predetermined magnitude, which is below the bursting pressure of the enclosure and any bursting discs which may be incorporated in the enclosure walls, the piston 18 is driven inwardly by the pressure difference between spaces 22 and 17a, against the spring 20 (or alternatively the pegs 30 shown in FIG. 2 are broken) so that the contact rod 19 makes electrical contact with conductor 10 (via the contacts 29 when fitted) and short-circuits the arc. The detent groove 19a on the contact rod 19 engages positively with the fingers 21 to lock the rod in that position.

The annular clearances provided between the piston 18 and the cylinder wall 17, and between the contact rod 19 and the plate 16 at the hole 16a, are so chosen that leakage through those clearances prevents significant pressure difference occurring across the piston 18 during normal filling of the enclosure 11 with SF₆ gas so that the device is not spuriously operated thereby.

The pipe 24 is such as to establish an effective pressure-difference across the piston 18 and the space 17a in front of the piston 18 is connected by vent holes 17b to a space 15a between the cylinder 17 and the chamber wall 15, in order to prevent the build-up of a high back-pressure during forward (inward) movement of the piston. Alternatively, the space 17a may be connected by a pipe (not shown) to an adjacent gas enclosure (not shown) to provide an even larger back-up volume.

The fault current through the contact rod 19 will be cleared by subsequent operation of an associated circuit-breaker, and the operation of the device to short-circuit the arc is indicated by means of the red indicator sleeve 27 which becomes visible through the transparent perspex or glass tube 25 on removal of sleeve 26 by the lowering of the piston.

It is essential to limit the pressure rise caused by the arc to a value below the bursting pressure of the enclosure, and preferably below the hydraulic test pressure and/or bursting diaphragm setting, if one is fitted. It is possible to meet these requirements by suitable choice of the diameter and mass of the operating piston and of the dimensions of the connecting passages. For example, for high rates of pressure rise the device can readily be designed to short-circuit the arc in a period less than 30 milliseconds. However, lower rates of pressure rise will result in slower operation of the device but will still limit actual pressure rises to values below a dangerous level.

As the possibility of an internal fault is very small, the device may be as simple and economical and need only be constructed as a single-shot device, so that replacement of the piston/contact is necessary after the device has operated to short-circuit an arc.

The device may readily be fitted to new and to existing installations, for example, onto existing access covers if and where the circumstances warrant.

In certain installations it may be preferable to mount the device so that during normal non-fault conditions the device is at high potential. On the occurrence of an arc the device responds in the opposite manner to that just described, the contact rod moving into contact with a member at earth potential.

Figure 3:
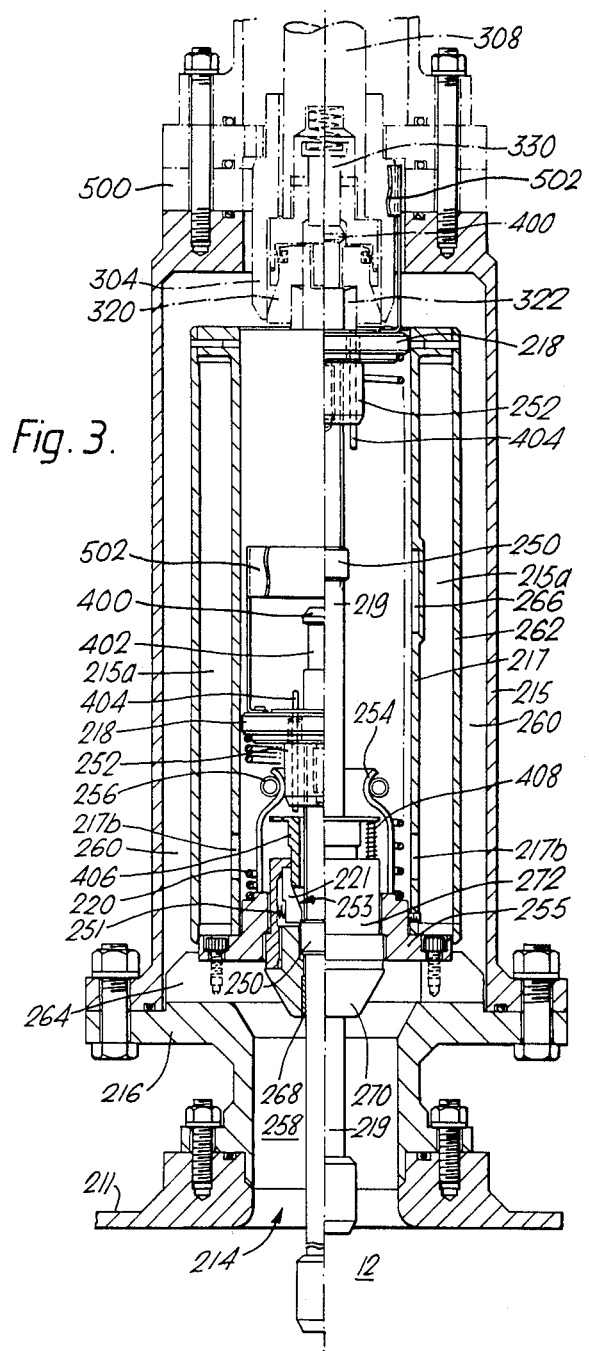
FIG. 3 is a vertical longitudinal section through a second form of device.

FIG. 3 shows a modified device having principal parts corresponding to those described above referenced by the same reference numbers but prefixed "2—." The left-hand half of the Figure shows in full lines the condition of the device after it has operated, in response to rise in pressure to short-circuit the arc causing the pressure rise; the right-hand half shows in full lines the normal fault-free condition.

The rod 219 has an annular detent 250 instead of a groove 19a and in the fully-extended position, the detent 250 is held locked by four latches 221 equiangularly spaced about the rod 219 as shown in the left-hand half of the Figure, the latches being biassed towards one another by respective light compression springs 251. Each latch 221 has an inclined inner cam surface 253.

The piston 218 has at its lower side an annular skirt 252 which as the piston approaches the lower limit of its travel (determined by engagement of the rod 219 with the conductor corresponding to the conductor 11), engages an annular array of upright resilient fingers 254, which are mounted on the lower annular end wall 255 of the cylinder 217 and which are embraced by a coil spring garter 256.

The frictional engagement of the skirt 252 with the fingers 254 (as shown in the left-hand half of the Figure) retards the final motion of the piston 218 and the rod 219 and prevents excessive impact and opposes and decreases any tendency for rebound action so that the action of the latches 221 is not jeopardised.

In this form of the device there is no pipe corresponding to the pipe 24 shown in FIG. 1. Instead, the plate 216 is annular and defines an annular opening 258 around the rod 219, which communicates with an annular space 260 defined between the housing 215 and a second cylinder 262 is arranged between the cylinder 217 and the housing 215. The end wall 255 is mounted on a castellated annular upstand 264 of the plate 216, so gas pressure changes are transmitted between the castellations to the space 260 and so to the open upper end of the cylinder 217.

The cylinder 217 has vent holes 217b similar to those shown in FIG. 1 but, in addition, the cylinder 217 has internal longitudinally-extending grooves 266. The grooves 266 are positioned so that just before the piston 218 has completed some two thirds of its advance, the grooves 266 establish communication between the two parts of the interior of the cylinder 217 at opposite sides of the piston 218. The pressure difference across the piston 218 is reduced by flow of gas from above the piston to below the piston and an additional dash-pot is imposed on the piston 218 to reduce its speed of advance.

The piston 218 has a small clearance from the cylinder 217 and this clearance and the dimensions of the vent holes 217b and the grooves 266 are carefully chosen to determine optimum response of the piston 218 to the rise in gas pressure caused by arcing and to determine optimum subsequent movement.

The rod 219 is slidable with a close fit in an insulating bush 268 in an annular boss 270 fitted into a ring 272. However, some gas flow past the bush 268 can occur. Electrical continuity is established between the rod 219 and earth by the engagement of the skirt 252 with the fingers 254 some 25 millimeters before the rod 219 engages the conductor. The ring 272 houses the latches 221 and is mounted in the end wall 255.

The device shown in FIG. 3 and described above may be used generally as an alternative to the device shown in FIG. 1, and may have an indicator means fitted to the upper end of the housing 215 to close the housing 215 in an analogous manner to that described with reference to FIG. 1.

However, the device shown in FIG. 3 may alternatively be combined with mechanism by which the rod 219 may be operated as an earthing contact and by which the rod 219 may be re-set after such operation or after it has operated to short-circuit an arc.

Figure 5:
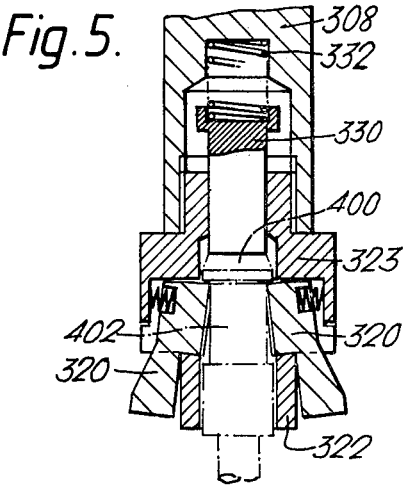
FIG. 5 is a vertical section through part of the device shown in FIG. 3 and through part of the mechanism shown in FIG. 4 showing a different condition of operation.
Figure 4:
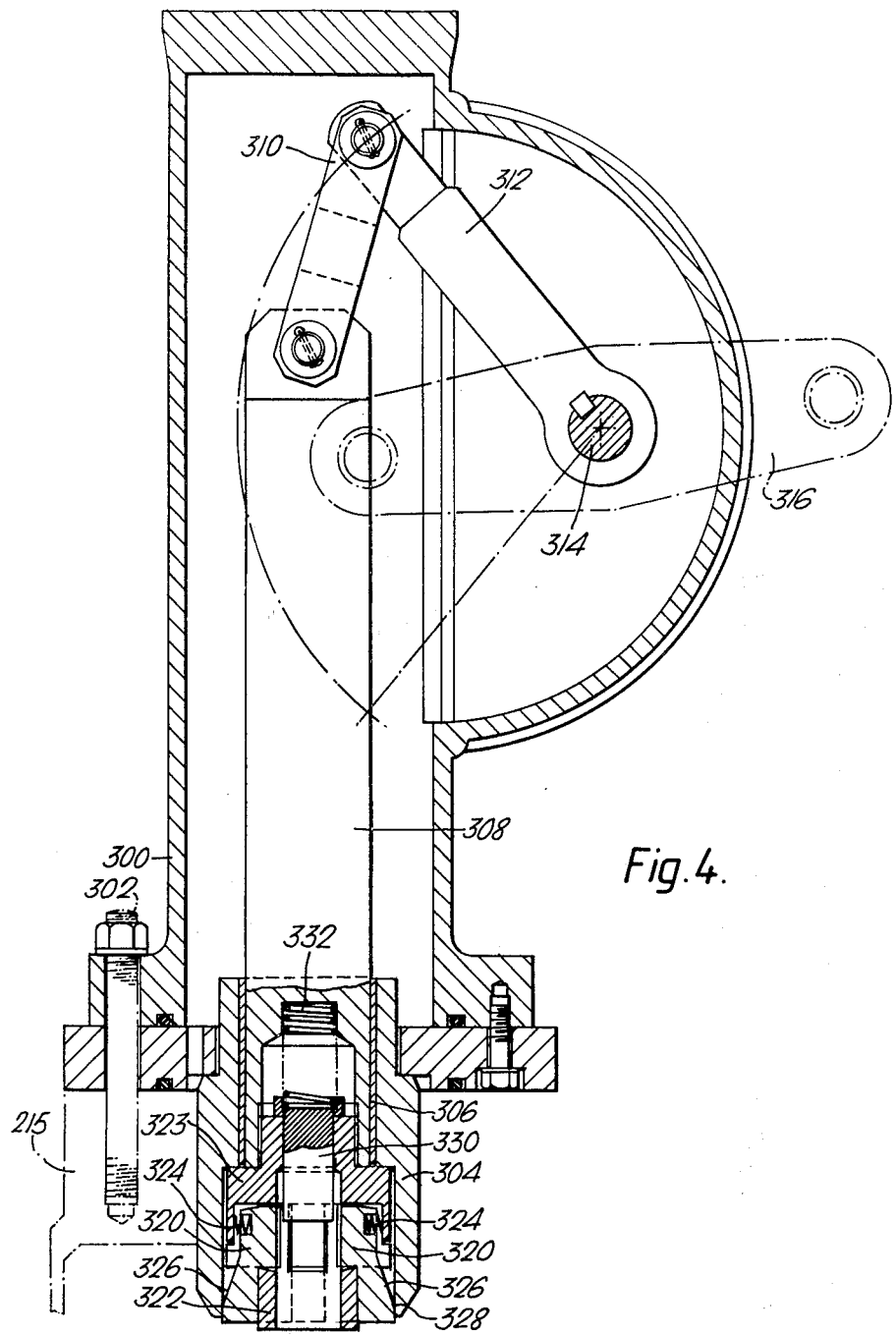
FIG. 4 is a vertical longitudinal section through a mechanism which is operable in combination with the device shown in FIG. 3 either to re-set the device after it has operated to short-circuit an arc or mechanically to operate the device to impose an earthed condition on a normally high voltage component of the switchgear.

FIG. 3 shows part of such mechanism in ghost outline and FIGS. 4 and 5 show the mechanism and part of the device in ghost outline. The ghost outline in FIG. 3 so far as it shows such mechanism shows it in its normal fault free condition.

The mechanism includes a housing 300 which is secured to the upper end of the housing 215 by studs 302.

The housing 300 has at its lower end a tubular mounting 304 supporting a bearing bush 306 through which a rod 308 slides. The rod 308 is pivotally connected by a link 310 to an arm 312 fixed on a rotatable shaft 314. The shaft 314 carries an operating lever 316, which is connectable to further means for turning the shaft 314.

The rod 308 carries four latches 320 equiangularly spaced about the central longitudinal axis of the rod 308. The latches 320 are mounted for angular movement on a ring 322 which is part of a tubular body 323 mounted partly inside a bore at the end of the shaft 308 and are biassed towards one another by respective light compression springs 324. Each latch 320 has an inclined cam face 326 engageable by the inner surface 328 of the mounting 304 to hold the latches 320 open, as shown in FIG. 4.

The tubular body 323 slidably supports a cylindrical piston 330 which is downwardly biassed by a light compression spring 332 to the position shown in FIG. 4 in which it protrudes into the space within the latches 320.

The position shown in ghost outline in FIG. 3 is that occupied by the mechanism under normal fault free conditions when the installation is in normal use without the need for any earthing of the conductor (corresponding to the conductor 10 shown in FIG. 1) is required. Note that the position in FIG. 4 corresponds generally to the normal condition except in relation to the latches as described below.

Should an arc occur between the conductor and the enclosure 211, the rod 219 will move into contact with the conductor in response to the rapid rise in pressure in the enclosure. The pressure rise is communicated through the openings 214 and 258 to the annular space 260 and thence to the upper side of the piston 218. The piston 218 is driven down by the pressure difference across it. Gas below the piston is displaced through the vent holes 217b into the annular space 215a.

Downward movement of the rod 219 removes a head 400 from within the tubular body 323 and allows the piston 330 to move down under the action of the spring 332 partly to occupy the position between the catches 320 previously occupied by a stem 402 carrying the head 400. The position now is as shown in FIG. 4.

When the rod 219 engages the conductor the rod 219 is in the position shown in the left-hand of FIG. 3, the latches 221 locking the rod 219 in position as shown.

In order to re-set the rod 219 after clearance of the fault condition, the mechanism shown in FIGS. 4 and 5 is operated to advance the rod 308. The latches 320 move down out of the mounting 304 but are kept open by engagement with the piston 330, which is positioned within the latches.

The rod 308 continues to advance and the tubular body 323 pushes the stem 402 and the rod 219 down until the ring 322 pushes rods 404 down against springs (not shown) through the skirt 252 (FIG. 3). The rods 404 push a ring 406 down against light springs 408. The lower end of the ring 408 pushes the cam surfaces 253 apart to release the latches 221 from the detent 250 (FIG. 3).

As the latches 221 are being released as just described, the latches 320 travel past the head 400 on the stem 402 which is carried by the upper end of the rod 219. The head 400 displaces the piston 330 against its spring 332 and the upper part of the stem 402 occupies the position formerly occupied by the part of the piston 330 within the latches 320. The latches 320 lock beneath the head 400 to connect the rod 219 to the rod 308 (see FIG. 5)

The mechanism shown in FIGS. 4 and 5 is now operated to raise the rod 308. The latches 320 lock the rod 219 to the rod 308 as shown in FIG. 5.

The detent 250 is pulled clear of the latches 221 before the rods 404 move upwardly with the piston 218 to allow the ring 406 to rise to its normal position shown in FIG. 3. Note that the rods 404 remain in their maximum downwardly displaced position relative to the piston 218 while the piston rises to its position shown in the right-hand half of FIG. 3. The rods 404 move to its upwardly displaced position relative to the piston 218 when the piston 218 descends in response to occurrence of an arc, leaving the rod 308 and ring 322 behind.

When the latches 320 reach the mounting 304 their cam surfaces 326 are pushed inwardly by the mounting 304 so that the latches 320 are opened to release the rod 219 and the parts once again occupy the positions shown in FIG. 4 and in ghost outline in FIG. 3.

As a separate function entirely from short-circuiting of an arc condition, the mechanism shown in FIGS. 4 and 5 is operable to operate the device shown in FIG. 3 mechanically, so as to earth the conductor within the enclosure 211, as follows:

The device occupies its normal position initially as shown in the right-hand half of FIG. 3 and the mechanism described with reference to FIGS. 4 and 5 is in the position shown in ghost outline in FIG. 3.

The mechanism is operated to advance the rod 308 which pushes the rod 219 down into engagement with the conductor in the enclosure 211 to impose an earthed condition upon it.

The condition of the latches 320 is now as shown in FIG. 5.

The rods 404 are in their positions of maximum downward displacement relative to the piston 218 throughout the downward movement of the piston 218 so that the rods 404 push the ring 406 down and hold it down while the rod 219 is in contact with the conductor. The rod 219 is therefore not locked in that position by the latches 221 during this imposed earthed condition, in contradistinction to the position when the rod 219 is in the same position for arc short-circuiting as described earlier.

The rod 219 is maintained in this case in its earthing position by the mechanism described with reference to FIGS. 4 and 5.

When it is required to remove the earthed condition from the conductor within the enclosure 211, the mechanism is operated to raise the rod 308 and to restore the rod 219 to the normal position shown in full lines in the right-hand half of FIG. 3 and in ghost outline in FIG. 3.

Although the devices shown in FIGS. 1 and 2 and in FIG. 3 have been described as though the contact rod moved vertically in each case, it will be appreciated that the invention is not limited to such orientation of the device, which may be oriented differently. The preferred orientation for the device described with reference to FIG. 3 is horizontal and the mechanism described with reference to FIGS. 4 and 5 in that preferred arrangement oriented horizontally.

FIG. 3 shows an annular window block 500 of transparent material sandwiched between the upper end of the housing 215 and the lower end 215 of the housing 300 and the piston 218 carries an indicator 502 which is visible through the window block 500 when the rod 219 is in its normal withdrawn position as shown in the right-hand half of FIG. 3.

If preferred, the device and mechanism just described can be modified, the head 400 and the stem 402 being omitted from the device and the latches 320 being omitted from the mechanism.

The mechanism would release the latches 221 after an arc short-circuiting operation as described but the rod 219 would be returned to its normal position by the spring 220 at a speed controlled by the control of the speed of movement of the rod 308, against which the spring 220 would always urge the piston 218.

The mechanism would be operable to push the rod 219 into a position to impose an earthed condition on the conductor within the enclosure 211 as before.

Grooves analogous to the grooves 266 may be provided in a device of the kind shown in FIG. 1; and that form of device may also be provided with retarding means analogous to the fingers 254; or combined with mechanism analogous to that described with reference to FIGS. 4 and 5.

In another modification (not shown) the means establishing communication between the interior of the enclosure and the interior of the operating cylinder of the device at the side of the piston remote from the contact rod may be a longitudinal passage through the contact itself.

Although the device has been described with reference to a single phase of an electrical switchgear installation, it will be obvious that the invention is applicable to polyphase installations. Furthermore, when the switchgear incorporates more than one component at high potential, the device may incorporate several contact rods for earthing respective components.

What we claim is:

1. An arc-shorting device in high-voltage metal clad switchgear comprising a conductor within an enclosure containing fluid insulating medium, which device comprises a contact movable to a position to interconnect said conductor electrically to said enclosure and piston-and-cylinder mechanism the cylinder of which communicates with the interior of said enclosure, said mechanism being operable in response to a rise in pressure in said fluid medium upon occurrence of an arc in said enclosure to move said contact to said position.

2. An arc-shorting device in high-voltage metal-clad switchgear which device comprises means for mounting said device on an enclosure of said switchgear containing fluid insulating medium, said device further comprising a cylinder, a piston movable in said cylinder and having first and second sides, a contact advanceable by said piston from a first retracted position to a second advanced position in which the contact engages a conductor within said enclosure to connect the conductor electrically to said enclosure, first means establishing communication between the interior of said enclosure and the interior of said cylinder at said first side of said piston, second means defining a space, third means establishing communication between said space and the interior of said cylinder at said second side of said piston, and restraint means to hold said piston in said first position, whereby rise in pressure in said fluid medium upon occurrence of an arc in said enclosure causes a pressure difference across said piston to overcome said restraint means whereupon said piston advances said contact to said second position.

3. An arc-shorting device in high voltage metal-clad switchgear which device comprises means for mounting said device on an enclosure of said switchgear containing a fluid insulating medium, said device further comprising a cylinder, a piston movable in said cylinder and having first and second sides, a contact in the form of a rod connected at one end to said piston at said second side thereof and advanceable by said piston from a first retracted position to a second advanced position in which the contact rod engages a conductor within said enclosure to connect the conductor electrically to said enclosure, a pipe establishing communication between the interior of said enclosure and the interior of said cylinder at said first side of said piston, a housing defining a space about said cylinder, vents establishing communication between said space and the interior of said cylinder at said second side of said piston, and restraint means to hold said piston in said first position, whereby rise in pressure in said fluid medium upon occurrence of an arc in said enclosure causes a pressure difference across said piston to overcome said restraint means whereupon said piston advances said contact rod to said second position.

4. An arc-shorting device in high-voltage metal-clad switchgear which device comprises means for mounting said device on an enclosure of said switchgear containing fluid insulating medium, said device further comprising a first cylinder, a piston movable in said cylinder and having first and second sides, a contact in the form of a rod connected at one end to said first piston at said second side thereof and advanceable by said piston from a first retracted position to a second advanced position in which the contact rod engages a conductor within said enclosure to connect the conductor electrically to said enclosure, a second cylinder defining a first space about said first cylinder, vents establishing communication between the first space and the interior of said first cylinder at said second side of said piston, a housing containing said cylinders and defining a second space about said second cylinder establishing communication with the interior of said first cylinder, an annular member through which said contact rod is advanceable establishing communication between the interior of said enclosure and said second space, and restraint means to hold said piston in said first position, whereby rise in pressure in said fluid medium upon occurrence of an arc in said enclosure causes a pressure difference across said piston to overcome said restraint means whereupon said piston advances said contact rod to said second position.

5. A device according to claim 2, in which said cylinder has means effective during an intermediate part of the travel of said piston to establish communication between respective parts of the interior of the cylinder at said first and second sides of said piston.

6. A device according to claim 2, in which said cylinder contains means frictionally engageable with a part carried by said piston during final approach of said piston to said second position to retard motion of said piston.

7. A device according to claim 2, in combination with mechanism operable to re-set said piston in said first position and to advance said piston to said second position.

8. A combination according to claim 7, in which said device includes first releasable latch means operable to hold said contact in said engagement, and said device includes latch release means operable in response to operation of said mechanism, and in which said piston is connected to a member grappable by second releasable catch means provided on said mechanism to enable said mechanism to pull said piston and contact back to said first position, said second catch means being maintained by said mechanism released from said grippable member while said piston occupies said first position.

9. A combination according to claim 8, in which said latch release means comprise latch release rod means mounted for movement through said piston, and a release member engageable by a first end of said rod means in a first position thereof relative to said piston to move said release member relatively to said first releasable latch means to release same, said rod means being engageable at a second end thereof by said mechanism to push said rod means to said first position relative to said piston, and said rod means having spring means biassing said rod means to a second position relative to said piston in which said rod means do not engage said release member when said piston occupies said second position and said mechanism is inoperative.

* * * * *